Figure 1:
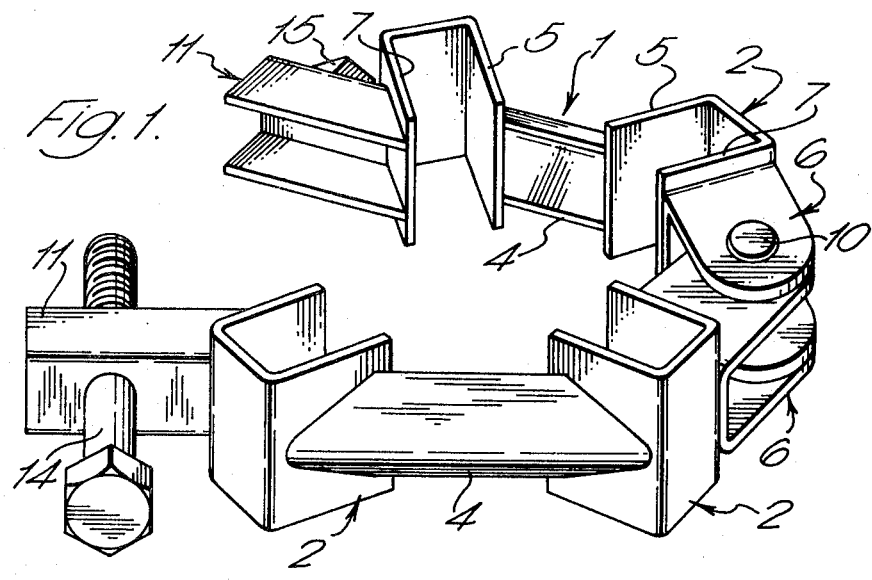

United States Patent [19]

Gostling

[11] 3,998,562
[45] Dec. 21, 1976

[54] SUPPORTING COLLAR FOR USE WITH BUILDERS SCAFFOLDING

[75] Inventor: Peter Eric Gostling, Sutton Coldfield, England

[73] Assignee: C. Evans & Sons Limited, Ilford, England

[22] Filed: Nov. 24, 1975

[21] Appl. No.: 634,488

[52] U.S. Cl. .............................. 403/235; 248/230; 248/226.2; 403/344
[51] Int. Cl.² ...................... F16B 2/10; E04G 7/14
[58] Field of Search ............ 403/49, 235, 191, 344; 248/226 C, 221 E, 221 F, 221 R, 230, 231; 182/179, 178

[56] References Cited

UNITED STATES PATENTS

| | | | |
|---|---|---|---|
| 1,893,702 | 1/1933 | Glenn | 403/191 |
| 3,059,250 | 10/1962 | Mayer | 248/231 X |
| 3,141,688 | 7/1964 | Taylor, Jr. et al. | 403/344 |
| 3,332,654 | 7/1967 | Jacobson | 248/221 |
| 3,420,557 | 1/1969 | Francis et al. | 182/179 |

FOREIGN PATENTS OR APPLICATIONS

| | | | |
|---|---|---|---|
| 1,219,706 | 12/1959 | France | 182/179 |
| 863,855 | 3/1961 | United Kingdom | 182/179 |

*Primary Examiner*—Andrew V. Kundrat
*Attorney, Agent, or Firm*—Baldwin, Wight & Brown

[57] ABSTRACT

A supporting collar for attachment to a tubular scaffold member having four radially disposed channel-shaped support brackets, said brackets being interconnected so that the open ends thereof are disposed about a circle. Said collar is formed in two hingedly connected parts, the free ends of said two parts being connectible by a nut and bolt device.

9 Claims, 5 Drawing Figures

U.S. Patent    Dec. 21, 1976    Sheet 1 of 3    3,998,562

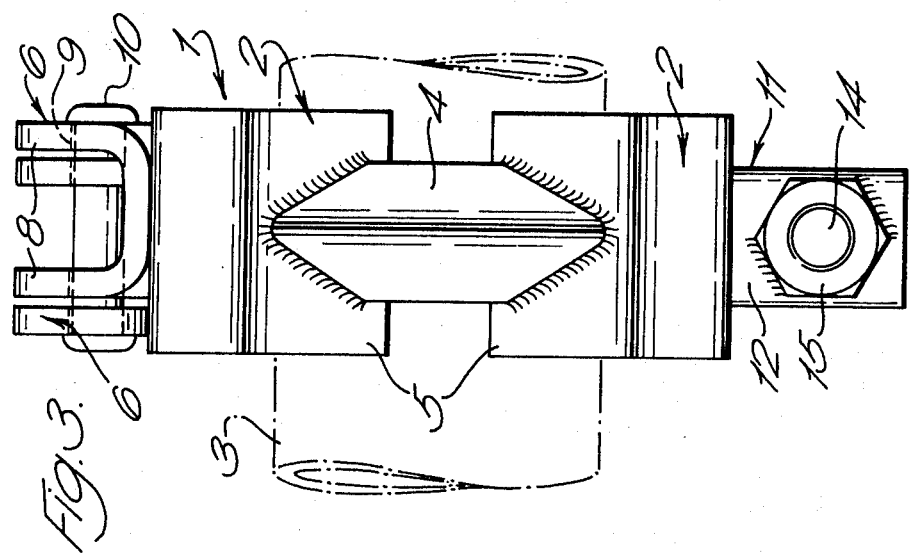
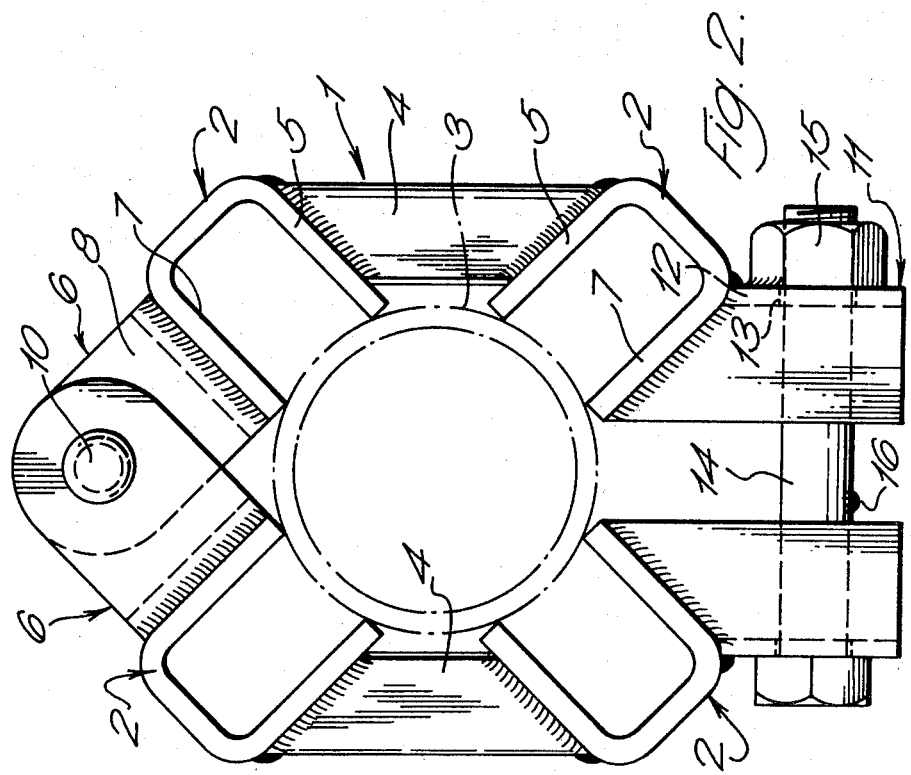

SUPPORTING COLLAR FOR USE WITH BUILDERS SCAFFOLDING

This invention relates to a supporting collar for use with the tubular members of builders scaffolding.

The supporting collar of the present invention is provided to be attached to any tubular member of a builders scaffolding whether it be for access or propping purposes. Thus, the collar may be attached to the standards or uprights, or to the propping elements, or to any other tubular elements to receive and support one end of a transom, a ledger, a bracing element, or any other element provided for interengagement therewith.

Supporting collars of the present kind usually comprise a short length of tube having four radially disposed support brackets fixed to the outer periphery thereof. In use, the tube is positioned over a tubular scaffold member and means are provided to lock the tube in a selected position to the tubular member. Whilst this is satisfactory for some purposes, it raises difficulties in present-day comprehensive scaffold systems, where standard centre-to-centre measurements are provided between the uprights or standards and other members, because the collar, in effect, increases the diameter of the tubular member.

It is among the objects of the present invention to overcome the aforementioned disadvantage and to provide a supporting collar in which the support brackets of the collar are in the same relative positions as they would be if they were directly fixed to a tubular member.

According to the present invention, there is provided a supporting collar for attachment to a tubular scaffold or other member, comprising four radially disposed U, V or channel-shaped support brackets arranged so that their open ends are directed inwardly towards each other and are disposed about a circle, and means outside the confines of said circle interconnecting the support brackets whereby, in the position of use, the free ends of the support brackets co-act directly with the outer peripheral surface of the tubular scaffold or other member.

Preferably, the collar is formed in two parts which at one end are hingedly connected and, at the other end, are detachably interconnected.

Figure 4:
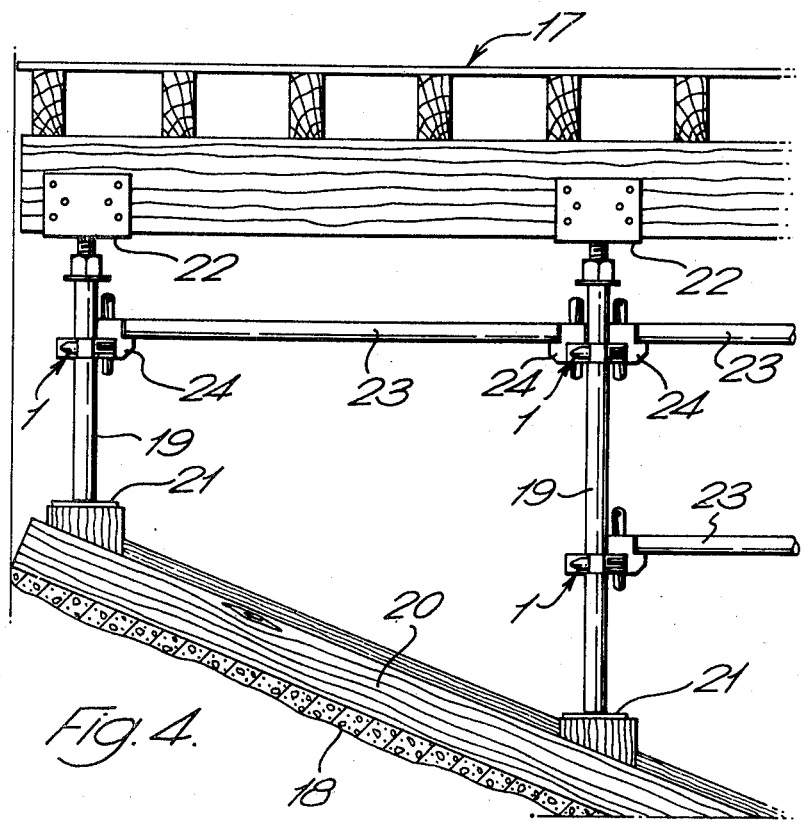

The invention is illustrated by way of example in the accompanying drawings in which, FIG. 1 is a perspective view of a preferred embodiment of supporting collar according to the invention, shown in a partly open position, FIG. 2 is a plan view of the collar of FIG. 1, FIG. 3 is a side elevation corresponding to FIG. 2, FIG. 4 is a side elevation showing part of a scaffold structure for propping purposes using the collar of FIGS. 1 to 3, and FIG. 5 is a perspective view showing part of a scaffold structure for access purposes using the collar of FIGS. 1 to 3.

Referring to FIGS. 1 to 3 of the drawings, there is shown a two-part collar 1 comprising four radially extending channel-shaped support brackets 2, the free ends of the side walls of which, in their positions of use, are disposed about the circumference of a circle indicated at 3. In practice, as is indicated in FIGS. 2 and 3, the circle 3 corresponds to the outer peripheral surface of a scaffold pole or other tubular member to which the collar can be attached.

Each part of the two-part collar 1 comprises two of the aforementioned brackets 2 which are connected together by a V-shaped web 4 disposed outside the confines of the circle 3, the web 4 extending between, and being fixed as by welding to, adjacent side walls 5 of the brackets 2.

A channel-shaped hinge element 6 is fixed to the other side wall 7 of one of the brackets 2. The element 6 is positioned so that its base wall bears against, and is fixed as by welding to, the side wall 7 of the bracket 2 so that the side walls of the element present a pair of spaced lugs 8. The lugs 8 are each formed with a hole 9 to receive a hinge pin 10. It will also be seen, particularly in FIG. 3, that the element 6 is fixed in an off-centre position relative to the depth of the bracket 2.

The side wall 7 of the other bracket 2 has fixed thereto, as by welding, an extension piece 11 which is preferably of channel-shaped cross-section. The base wall 12 of the extension piece 11 is formed with a hole 13 to receive a bolt 14.

It will be appreciated that both parts of the two-part collar so far described are of exactly the same construction thereby providing the advantage that manufacture is simplified because only a single part requires to be produced.

In assembling the collar, two identical parts are interconnected by passing the hinge pin 10 through the coincident holes 9 in the hinge elements 6, and by passing the bolt 14 through the coincident holes 13 in the extension piece 11, one end of the bolt 14 being screw-threaded to receive a nut 15. In this respect, it will be seen, particularly from FIG. 3, that assembly is facilitated by the off-centre positioning of the hinge elements 6.

Furthermore, in order to prevent loss of the nut and bolt, the nut 15 is welded to the extension piece 11 of one collar part and the shank of the bolt 14 is formed with a projection, for example a spot weld 16, to retain it in position in the extension piece 11 of the other collar part.

In use, the bolt 14 is unscrewed from the nut 15 so that the two collar parts can be pivotted relative to the hinge pin 10 and the collar positioned over a tubular element 3 as shown in FIGS. 2 and 3. In this position, the nut and bolt are tightened up so that the collar is firmly attached to the tubular member 3.

As can be seen from FIG. 2, the free ends of the walls 5 and 7 of the brackets 2 directly engage the tubular member 3 and therefore the positions of the brackets 2 are the same as they would be if they were directly welded to the tubular member 3. Furthermore, since the nut and bolt are attached to the respective extension pieces 11, there are no loose parts which can be mislaid during use.

Although the invention has been described with reference to the brackets 2 being of channel-shaped formation, it will be appreciated that it is not limited in this respect. Thus, the brackets 2 may be U or V-shaped, or any other convenient shape of open formation in order to receive the ends of the members to be supported thereby.

Referring now to FIG. 4, there is shown one example of a scaffold for propping purposes in which the supporting collar 1 as hereinbefore described is used. The scaffold is used to support shuttering generally indicated at 17 on an inclined site indicated at 18.

For this purpose, vertical tubular members 19 are supported, via timber bearing plates 20, on the site 18, the members 19 each having a base plate 21, and an adjustable fork head fitting 22 to which the main beams of the shuttering 17 is fixed. In order to hold the members 19 firmly in position, supporting collars 1 are attached thereto, in the manner hereinbefore described, in vertically spaced positions. Suitable horizontal bracing members 23 having hook shaped ends 24, for example transoms and/or ledgers of the kind disclosed in our co-pending patent applications Nos. 47336/72 and 47796/73, the latter being a division of the former, and there now being corresponding U.S. Pat. Nos. 3,879,143 and 3,880,533, respectively, are then positioned between the members 19 with their hook shaped ends 24 in engagement with the brackets 2 of the collars 1.

Figure 5:
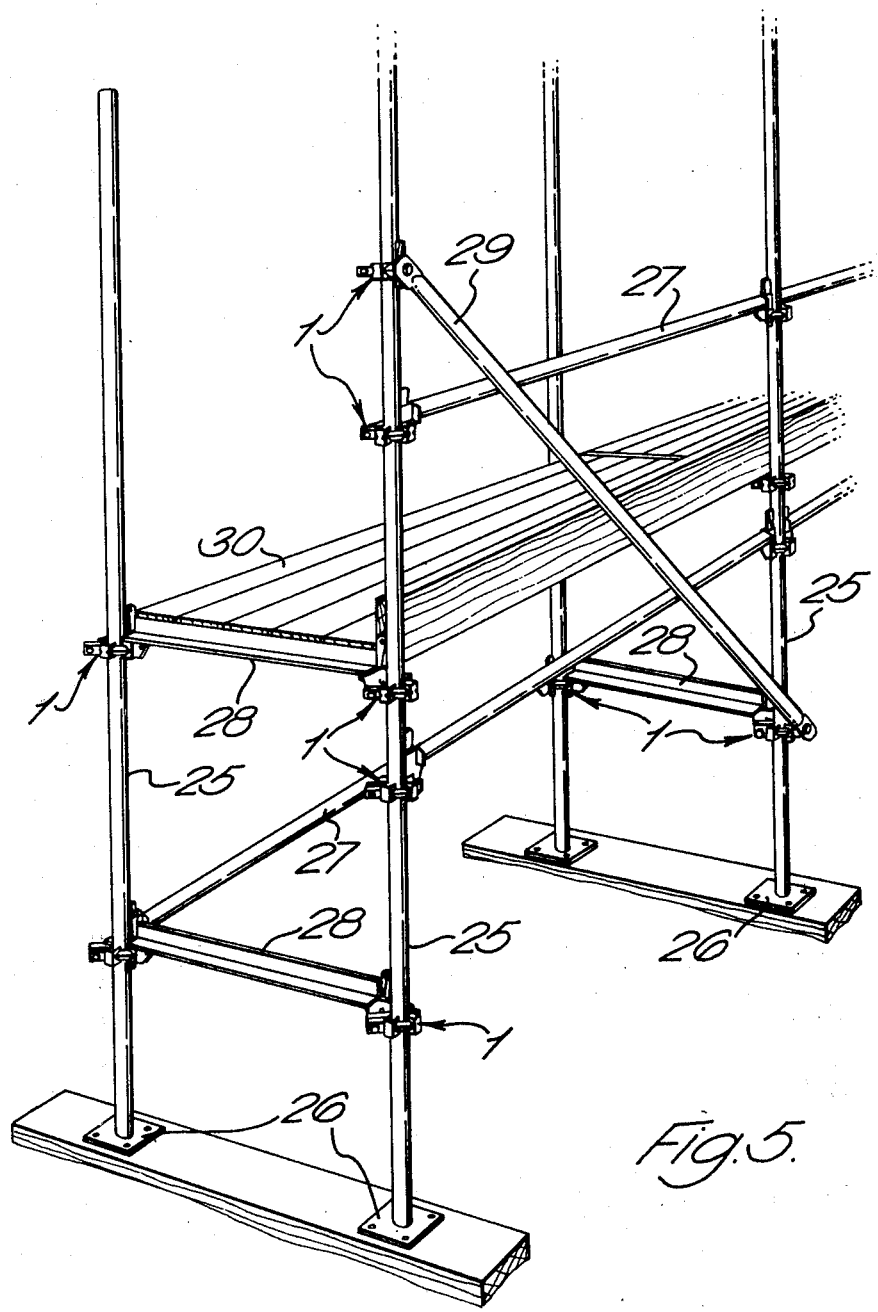

Referring now to FIG. 5, there is shown a scaffold for access purposes using the supporting collars 1 hereinbefore described.

For this purpose, spaced pairs of tubular upright members or standards 25 having detachable base plates 26 are provided. Horizontal longitudinally disposed ledgers 27 and transversely disposed transoms 28 having hook-shaped ends in the form disclosed in our co-pending patent applications Nos. 47336/72 and 47796/73 are provided to extend between the uprights or standards 25. For this purpose, spaced supporting collars 1 as hereinbefore described are provided, the brackets 2 of which receive the hook-shaped ends of the ledgers and transoms.

As shown in the drawing, the existing, or further, supporting collars 1 may be provided to receive and support the hook-shaped ends of diagonal bracing members 29.

Suitable scaffold boards 30 are supported by the transoms 28 to provide a working platform.

We claim:

1. A supporting collar for attachment to an upright member of a builders scaffold for access and propping purposes, said collar having four radially disposed open-sided support brackets arranged so that the open ends of said brackets are directed inwardly towards each other and are disposed about a circle, and means outside the confines of said circle interconnecting said support brackets, said collar specifically including two collar parts which, at one end, are hingedly connected together and, at the other end, are detachably interconnected, each of said collar parts including two of said support brackets, a web fixedly secured at its ends to adjacent side walls of said brackets, a hinge element fixed to the other side wall of one of said brackets, and an extension piece fitted to the other side wall of the other of said brackets, whereby, in the position of use, said free ends of said support brackets bear directly against the outer peripheral surface of said upright member.

2. A supporting collar as claimed in claim 1, in which said hinge element is fixed to its co-acting bracket in a position which is off centre relative to the depth of said bracket whereby, in the assembled position, said hinge elements of each of said collar parts overlap and have a hinge pin passing therethrough.

3. A supporting collar as claimed in claim 2, in which a bolt is provided to extend through said extension pieces of said two collar parts said bolt receiving a nut.

4. A supporting collar as claimed in claim 3, in which said nut is fixedly secured to one of said extension pieces.

5. A supporting collar as claimed in claim 3, in which said bolt is held captive in the other of said extension pieces.

6. A supporting collar for attachment to an upright member for access and propping purposes, said collar comprising a plurality of radially disposed open-sided support brackets arranged so that the open ends of said brackets are directed inwardly towards each other and are disposed about a closed configuration corresponding substantially to the external configuration of the intended support member, and means outside the confines of said closed configuration positively interconnecting adjacent walls of said support brackets, said collar comprising two collar parts which at one end are hingedly connected together and at the other end are detachably interconnected, whereby, in the position of use, said free ends of said support brackets bear directly against the outer peripheral surface of the upright member, and each collar part including at least one of said support brackets.

7. A supporting collar according to claim 6 wherein said support brackets comprise the sole means of said collar for engaging the upright member.

8. A supporting collar according to claim 7 wherein each said collar part is formed solely of rigid members rigidly secured together.

9. A supporting collar according to claim 6 wherein each said collar part is formed solely of rigid members rigidly secured together.

* * * * *

UNITED STATES PATENT AND TRADEMARK OFFICE
CERTIFICATE OF CORRECTION

PATENT NO. : 3,998,562

DATED : December 21, 1976

INVENTOR(S) : Peter Eric Gostling

It is certified that error appears in the above-identified patent and that said Letters Patent are hereby corrected as shown below:

The following was omitted from the patent heading:

Foreign Application Priority Data

Dec. 6, 1974     Great Britain     52,842/74

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*